PRUDDEN ALLING, OF NORWALK, OHIO.

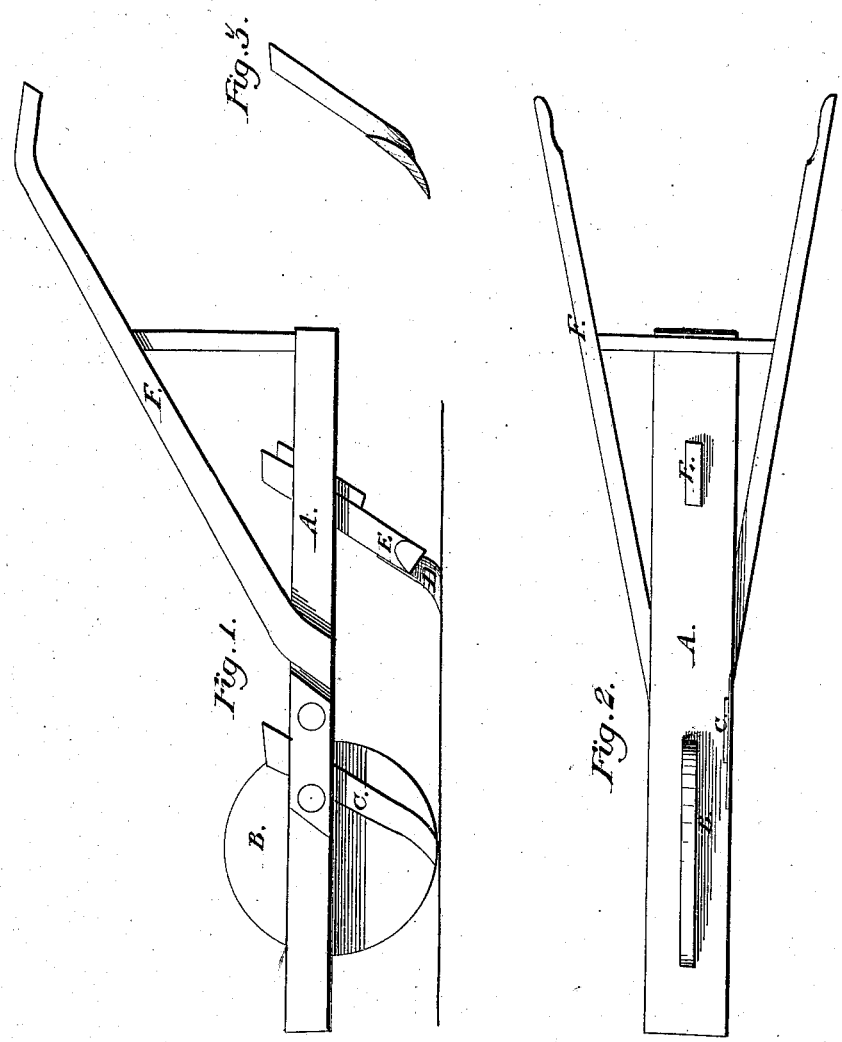

Letters Patent No. 83,437, dated October 27, 1868.

IMPROVEMENT IN VINE-CUTTER AND GARDEN-CULTIVATOR COMBINED.

The Schedule referred to in these Letters Patent and making part of the same.

*To all whom it may concern:*

Be it known that I, PRUDDEN ALLING, of Norwalk, in the county of Huron, and State of Ohio, have invented a certain new and useful Improvement in Vine-Cutter and Garden-Cultivator; and I do hereby declare that the following is a full and complete description of the same, reference being had to the accompanying drawings, making a part of this specification, in which—

Figure 1 is a side view of the machine.
Figure 2, a view of the top.
Figure 3, a detached section.

Like letters of reference refer to like parts in the several views.

This invention relates to a machine for cutting ground-vines, as strawberry, &c., and for stirring the ground in and among them, and for the cultivation of other garden-plants, thus combining in one machine a cultivator and vine-cutter.

In fig. 1, A represents a beam, in the front end of which is hung a wheel, B, on which the implement rolls and is kept steady.

Immediately in the rear of the axle of the wheel, and on one side of the same, is secured a sharp and pointed cutter, C.

Still further in the rear, and directly in line with the wheel, is a cultivator or share, D, secured to the standard E, said standard being attached to and fixed in the beam, as shown in fig. 1.

F are the handles, whereby the implement is held and guided.

The practical use of this machine is for cutting the runners in strawberry-beds, and stirring the ground between the beds or rows, so that the plants shall be confined to the rows or narrow beds, instead of a wide and general spreading of the plants all over the ground.

A horse being hitched to the machine, it is then drawn along between the rows or beds of plants, the wheel holding it steadily as the person guides it along in the line of work. The cutters, as will be evident, will cut off the runners close to the rows, it being placed on one side for that purpose.

This operation is followed by the stirring up of the ground by the cultivator D, which will root up the stray and wandering plants, and thus leave the ground free of vines and weeds, and well stirred up.

The share used for this purpose is simply a single-winged share or blade, which will leave the ground in narrow ridges or furrows; but for ordinary use between the rows of other garden-plants, a double-winged share or blade, fig. 3, is the best, and which can be easily and readily substituted for that shown in fig. 1.

What I claim as my invention, and desire to secure by Letters Patent, is—

The wheel B, cutter C, cultivator D, and beam A, combined and arranged to operate in the manner as and for the purpose set forth.

PRUDDEN ALLING.

Witnesses:
W. H. BURRIDGE,
J. H. BURRIDGE.